R. J. WALTHER.

MECHANICAL MOTOR FOR GAS MACHINES.

APPLICATION FILED OCT. 10, 1911.

Reissued July 16, 1912. 13,445.

Witnesses:
F. N. Alfields
Charles Poole

Inventor
Rudolph J. Walther
by Poole & Brown Attys

COLUMBIA PLANOGRAPH CO., WASHINGTON, D. C.

UNITED STATES PATENT OFFICE.

RUDOLPH J. WALTHER, OF DAVENPORT, IOWA, ASSIGNOR TO WALTHER-VOGLER GAS MACHINE COMPANY, OF DAVENPORT, IOWA.

MECHANICAL MOTOR FOR GAS-MACHINES.

13,445. Specification of Reissued Letters Patent. Reissued July 16, 1912.

Original No. 982,321, dated January 24, 1911, Serial No. 482,152. Application for reissue filed October 10, 1911. Serial No. 653,960.

*To all whom it may concern:*

Be it known that I, RUDOLPH J. WALTHER, a citizen of the United States, residing at Davenport, in the county of Scott and State of Iowa, have invented certain new and useful Improvements in Mechanical Motors for Gas-Machines, of which the following is a full, clear, and exact description, such as will enable others skilled in the art to which it appertains to make and use the same.

The invention relates to mechanical movements and is designed to arrange for the convenient manipulation of a weight actuated motor by hand, to wind up the weight by means of a handle, to provide for carrying a drum of the pump forward in its usual direction while the weight is being wound up, so that the opposite movement of the winding mechanism shall impart motion to the blower.

It is furthermore designed to provide automatic means by which the drum of the pump shall be carried forward by the rotation of the handle at such times only as the pressure in the gas tank shall be at a predetermined minimum.

Figure 1:
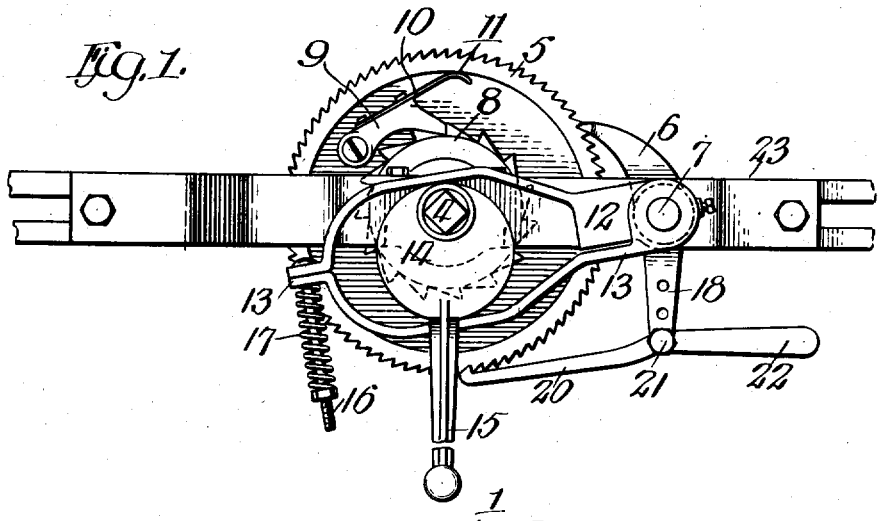
Figure 2:
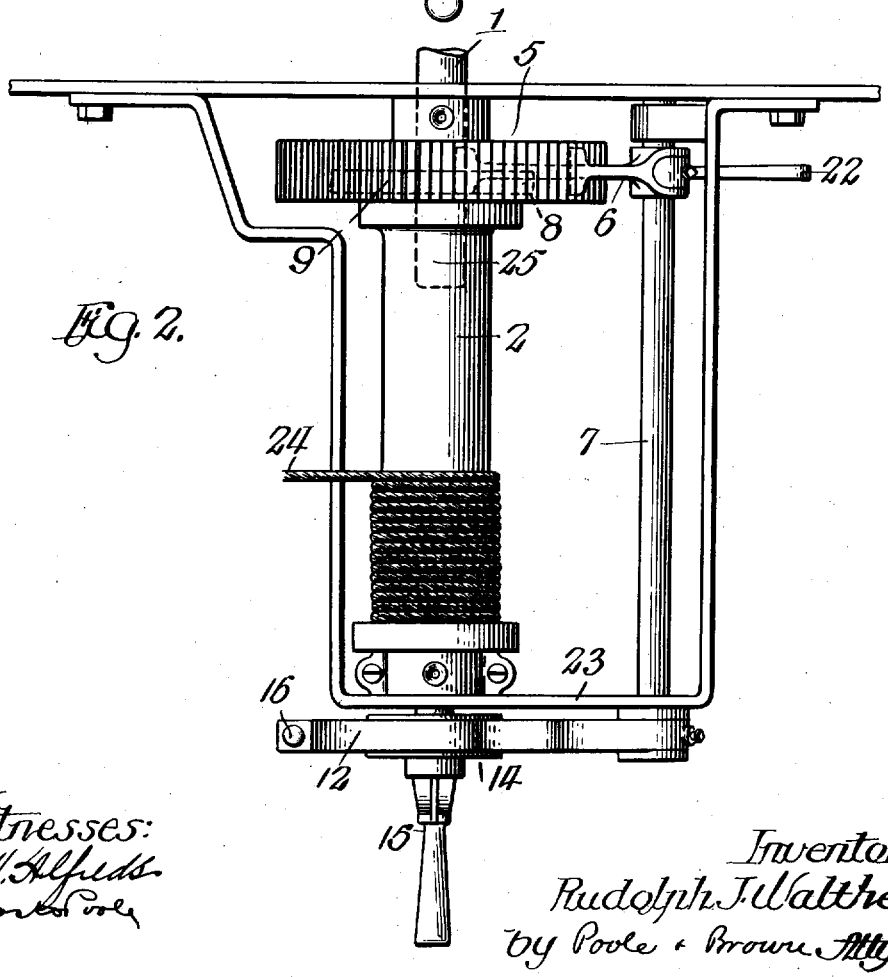

With these and other objects in view, the invention consists of the novel construction and combination of parts hereinafter described and claimed, reference being had to the accompanying drawings, wherein, Figure 1 is an end view of a motor constructed in accordance with this invention; and Fig. 2 is a front elevation of the drum and the ratchet wheel.

Like characters of reference are employed to designate corresponding parts in all the figures of the drawings.

In the drawings, the numeral 1 denotes the shaft of a rotary air pump, such as is commonly employed for forcing air into and through a tank containing gasolene for the production of illuminating gas. This shaft is journaled in the outer end of a cylindrical case not shown in the drawing and in the rear end of the supporting frame. This shaft is rigidly secured to ratchet wheel 5.

The numeral 2 denotes the winding drum which takes upon it the cord to which is attached a propelling weight attached to cord 24 and not shown in the drawing, terminates in the stub shaft 4, which is formed with the drum, and is journaled in a proper support and has its extreme outer end squared to take upon it a winding handle 15. On its inner end the drum is journaled upon a boss 25 projecting from the ratchet wheel 5. Formed with the inner extremity of the drum is the ratchet disk 8, concentrically disposed and adjacent to the ratchet wheel 5 and adapted to revolve in a clockwise direction when the weight is being wound up. A ratchet pawl 9 is mounted upon ratchet wheel 5 and is held in engagement with wheel 8 by means of the flat spring 10 lying within a flange 11 on wheel 5. Adjacent to the ratchet wheel 5 and loosely mounted upon shaft 7 extending parallel with the axis of the drum, is the ratchet pawl 6, coöperating with the ratchet wheel 5 and preventing the backward movement of the blower. To the lever 18, rigidly attached to shaft 7, is pivotally attached the pawl 20 and 21, which is counterbalanced at 22 and is adapted to engage the ratchet teeth on wheel 5. At the front of the mechanism and outside of frame 23, a yoke consisting of members 12 and 13 is attached to the front end of shaft 7 and hangs loosely over the squared end of shaft 4, the member 12 being rigidly attached, and the member 13 loosely connected to said shaft 7. The minimum spread between the yoke members is equivalent to the diameter of the eccentric 14 formed with the removable handle 15. The rigid yoke member 12 is loosely clamped to the free member 13 by the bolt 16 and is held in contact therewith by the helical spring 17.

When the weight is wound up and its gravity allowed to operate, it tends to drive the drum 2 and its ratchet disk 8 in a counter clock-wise direction as here shown. By the action of the pawl 9 the power is communicated to ratchet wheel 5, by which means the blower is slowly revolved. In winding up the weight the eccentric 14, revolving with the handle 15 and within the yoke members 12 and 13 will actuate the said yoke members alternately. Coming in contact with member 12, the said member is upwardly displaced, causing a partial rotation of shaft 7 to whose forward end it is secured and to whose rear end is rigidly secured lever 18 and to which pawl 6 is freely attached both pawls engaging ratchet wheel 5. This upward displacement actuating lever 18 and pawl 20 advances pawl 20 one or more ratchet teeth on the periphery of wheel 5. Continuing its revolution, eccentric 14 engages member 13 of the yoke, which it displaces in a downward direction. The spring 17 on bolt 16 is adjusted to a predetermined minimum pressure on ratchet wheel 5, below which, experience shows that pressure in the carbureter must be maintained by mechanical means during the process of winding the drum. Should the resistance on ratchet wheel 5 be less than the pressure on spring 17, both yoke members act under the pressure of the eccentric 14 as an integral yoke, member 13 coöperating with member 12 to displace member 12 in a downward direction, to retract pawl 20 and with it to advance ratchet wheel 5 one or more ratchet teeth. Should the pressure in blower and carbureter be as high or higher than the predetermined minimum, ratchet wheel 5 will offer greater resistance than is represented by spring 17, which in this case will give under the pressure of the eccentric, when although the yoke member 13 will be displaced downwardly as before, the member 12 will not be so displaced, therefore although pawl 20 has been advanced by the upward displacement, it will not be retracted by a lower displacement, as member 12 will remain stationary in its upward position. In either case the winding of the drum will be continued until it is wound up and the necessary pressure maintained in the carbureter.

I claim as my invention:

1. The combination with a rotative driven member, of a rotative driving member, a pawl and ratchet connection between said driving and driven members, acting to effect rotation of the driven with the driving member when the latter is turned in one direction, and a separate driving connection between said driving and driven members for turning the driven member when the driving member is rotated in the opposite direction, embracing a pawl and ratchet mechanism and a yielding member through which motion is transmitted from the driving member to said pawl and ratchet mechanism; said pawl and ratchet mechanism acting to impart a positive, intermittent rotative motion to the driven member and said yielding member serving to prevent the transmission of motion to the driven member when a predetermined minimum resistance in said driven member is exceeded.

2. The combination with a rotative driven member, of a rotative driving member, a pawl and ratchet connection between said driving and driven members, acting to effect rotation of the driven with the driving member when the latter is turned in one direction, and a separate driving connection between said driving and driven members acting to impart rotative motion to the driven member when the driving member is turned in the opposite direction, said separate driving connection embracing a spring through which motion is transmitted from the driving to the driven member and means for adjusting the tension of said spring.

3. The combination with a driven shaft, of a rotative driving member, a pawl and ratchet connection between said driving and driven members, acting to effect rotation of the driven with the driving member when the latter is turned in one direction, and a separate driving connection between said driving and driven members for turning the driven member when the driving member is rotated in the opposite direction, embracing a pawl and ratchet mechanism, a spring through which motion is transmitted from the driving member to the said pawl and ratchet mechanism, and means for adjusting the tension of said spring.

4. The combination of a drum having a ratchet disk, a cord adapted to actuate the drum in one direction, a ratchet wheel provided with a flange forming a recess adapted to contain the ratchet disk, a pawl on the ratchet wheel adapted to engage the teeth on the ratchet disk and having a flat spring engaging the flange on the ratchet wheel, a shaft in axial line with the drum to which the ratchet wheel is secured, a second shaft parallel to the axis of the drum and of equal length, a pawl loose on said second shaft engaging the ratchet wheel on its outer periphery, a lever rigid on the shaft, a pawl pivotally attached to the lever and adapted to actuate the ratchet wheel, a yoke on the opposite end of said shaft, a handle bearing an eccentric adapted to engage the yoke and the squared end of the drum axis.

5. A mechanical motor comprising a frame, bearings in the frame, a shaft journaled in the bearings, a ratchet wheel at the extremity of the shaft, a boss on the ratchet wheel, a drum, a stub shaft integral with the drum, its outer end journaled in the frame, a squared end on the stub shaft, a seat in the end of the drum adapted to receive the boss, means for revolving the drum, a second shaft parallel to the drum axis, a yoke comprising two outwardly curved members mounted on the front end of the second shaft, a bolt passing through the distal ends of the yoke members, a helical spring on the bolt outside the yoke members, a nut on the bolt adapted to adjust the spring to a predetermined tension, an eccentric adapted to fit the squared end of the drum shaft and alternately actuate the yoke members, a handle integral with the eccentric.

6. The combination with a drum having a ratchet disk formed therewith and a squared end on its axis, a ratchet wheel adjacent to the ratchet disk and independent thereof, a pawl mounted on the ratchet wheel and engaging the ratchet disk, a shaft parallel to the axis of the drum, a rigid lever borne by the shaft, a pawl pivotally attached to the lever and engaging the ratchet wheel, a pawl loosely attached to the shaft and engaging the teeth of the ratchet wheel, a yoke member rigidly attached to the opposite end of the shaft and in alinement with the squared end of the drum axis, a second yoke member loosely attached to the shaft adjacent to the first yoke member, a bolt uniting the yoke members, a helical spring mounted on the bolt outside the second member, a nut on the bolt outside the helical spring, a removable handle adapted to fit the squared end of the drum shaft, an eccentric formed with the handle and adapted to alternately actuate the yoke members to maintain a predetermined pressure in the blower.

7. A mechanical motor comprising a frame, front and back bearings in the frame, a shaft mounted in the bearings, a drum, a recess in the drum, a stub shaft formed with the drum and journaled in the front bearing of the frame, a squared end on the shaft, a ratchet wheel, a boss upon the ratchet wheel, journaled from without into the back bearing of the frame and into the recess in the drum, a ratchet disk formed with the drum and lying against the face of the ratchet wheel, a spring actuated pawl mounted on the ratchet wheel and engaging the ratchet disk, a shaft mounted in the frame parallel to the drum axis, a lever rigidly attached to the shaft, a pawl pivotally attached to the lever and adapted to engage the teeth in the ratchet wheel, a pawl adjacent to the lever loosely mounted on the shaft and adapted to engage the teeth of the ratchet wheel on its upper arc, a yoke member rigidly attached to the front extremity of the shaft without the frame, a second yoke member adjacent to the same and loosely mounted on the shaft, a bolt adapted to join the distal extremities of the yoke members, about the squared end of the drum shaft, a handle adapted to engage the said squared end, an eccentric formed with the handle and adapted to alternately actuate the yoke members to produce through the action of the pawls a normal revolution of the ratchet wheel while winding the drum.

In testimony that I claim the foregoing as my invention, I affix my signature in the presence of two witnesses, this 28th day of September, A. D. 1911.

RUDOLPH J. WALTHER.

Witnesses:

C. Clarence Poole,

W. M. Chamberlin.

Copies of this patent may be obtained for five cents each, by addressing the "Commissioner of Patents, Washington, D. C."